United States Patent [19]
Nakane

[11] 3,791,502
[45] Feb. 12, 1974

[54] CLUTCH WITH WEAR COMPENSATING RELEASING SPRING

[75] Inventor: Mototaka Nakane, Hekinan, Japan

[73] Assignee: Aisin Seiki Kabushiki Kaisha, Karuja, Aichi pref., Japan

[22] Filed: Feb. 23, 1972

[21] Appl. No.: 228,665

[30] Foreign Application Priority Data
Feb. 23, 1971  Japan.............................. 46/008782

[52] U.S. Cl............. 192/111 A, 192/70.28, 267/161
[51] Int. Cl............................................. F16d 13/75
[58] Field of Search. 192/111 A, 89 R, 70.25, 70.28

[56]  References Cited
UNITED STATES PATENTS

| 3,128,862 | 4/1964 | Ludwig | 192/70.28 |
| 1,768,346 | 6/1930 | Thompson | 192/70.28 X |
| 2,174,316 | 9/1939 | Dunkelow | 192/111 A X |
| 3,403,755 | 10/1968 | Barrett et al. | 192/111 A X |
| 3,702,651 | 11/1972 | Fujita et al. | 192/111 A X |

FOREIGN PATENTS OR APPLICATIONS
1,926,431    5/1969    Germany.......................... 192/70.28

*Primary Examiner*—Benjamin W. Wyche
*Attorney, Agent, or Firm*—Oblon, Fisher, Spivak, McClelland & Maier

[57]  ABSTRACT

The invention relates to a vehicle clutch releasing mechanism including a releasing means made of ductile material having both ranges of elastic and plastic deformation and being assembled resiliently and immovably in an axial direction in the clutch engaging state and adapted for positively serving as a pusher of the clutch disc assembly during clutch releasing operation and for compensating wearing amount of clutch facing elements of the clutch disc assembly by its plastic deformation when clutch facing elements wear and for keeping its elastic thrust energy constant, and for limiting the returning of the clutch disc assembly to a constant amount.

5 Claims, 11 Drawing Figures

CLUTCH WITH WEAR COMPENSATING RELEASING SPRING

BACKGROUND OF THE INVENTION

This invention relates to improvements in and relating to a vehicle clutch releasing mechanism, especially adapted for use on automotive vehicles.

Generally speaking, conventional vehicle clutch releasing mechanisms are not presently fitted with positive clutch releasing means for positively releasing a clutch disc plate assembly from engagement with the flywheel fixedly mounted on the input shaft consisting generally of the crankshaft of the vehicle drive engine. Most conventional clutch releasing mechanisms rely instead upon negative means such as engine vibration or the like. The clutch disc plate assembly is mounted between the flywheel and an axially shiftable pressure plate and is fitted with facing elements adapted for engagement with both the flywheel and pressure plate on the one hand, and is mounted through a boss axially slidably on an output shaft, yet rotatable in unison therewith, on the other hand. This output shaft is arranged concentrically with the input shaft and is relatively rotatable therewith. Since the clutch disc plate assembly is coupled through a spline connection with the output shaft, a substantial sliding resistance is encountered thereat, even upon axial movement of the pressure plate in its clutch releasing direction, resulting in a substantial retardation in the clutch releasing movement of the clutch disc assembly and thus the remainingly effective engagement of the clutch facing element with the flywheel thereby inviting an entrained rotation of the assembly. This residual phenomenon gives rise to gearing cricks and creep phenomenons of a gear transmission in the related mechanical parts. Further there is no adjusting means in the prior mechanisms in which the returning amount of the clutch disc assembly is held constant.

There has been introduced such a vehicle being provided with means for moving the clutch hub to the side of the pressure plate overcoming the sliding resistance at the splined portion of the clutch hub, however, there yet has been no provision of means for limiting the returning amount of the clutch hub or means for constantly pushing the clutch hub back to a certain position. Accordingly, in these means, it is feared that the clutch facing element adheres to the pressure plate when the lever height of a diaphragm spring and the release gap between the clutch facing element and the flywheel are adjusted.

In addition, there has been introduced such a vehicle being provided with a means for adjusting the returned position of the clutch hub by adjusting the friction force of a friction means being disposed between a member rotating in unison with the output shaft and the clutch hub and for pushing back the clutch hub. This friction force varies with the error introduced in making these members and the qualitatively stabilized friction means could not be mass produced and the means also proves very expensive due to the grinding treatment of the friction face thereof necessary for providing the stabilized means. To stabilize the friction force being caused by the friction means, a means has been presented for engagement with the serration provided on the clutch hub, but the regulating amount, however, could be adjusted only by the pitch unit and fine adjustment was not possible. These deficiencies are considered to be greatly disadvantageous in practice.

SUMMARY OF THE INVENTION

It is, therefore, an object of the present invention to provide an improved vehicle clutch releasing mechanism adapted for obviating the aforementioned drawbacks of conventional releasing mechanisms.

It is another object of the present invention to provide an improved vehicle clutch releasing mechanism for providing a gap between a flywheel and a clutch facing element upon clutch release operation.

It is still another object of the present invention to provide an improved vehicle clutch releasing mechanism capable of providing a constant gap between a flywheel and a clutch facing element upon clutch release operation.

It is a further object of the present invention to provide a unique and highly simplified releasing mechanism of a friction clutch of the positively acting type.

The foregoing and other objects are attained according to one aspect of the present invention through the provision of a releasing member for a vehicle clutch releasing device being formed of a ductile material having both ranges of elastic and plastic deformation and being disposed resiliently and immovably in an axial direction in a clutch engaging state between an output shaft and a clutch hub of a clutch disc assembly provided between a flywheel and a pressure plate and mounted axially slidably on and rotatably with the output shaft. The releasing member is operative as a pusher of the clutch disc assembly during a clutch releasing operation through its plastic deformation to insure moving the clutch disc assembly back away from the flywheel a constant amount regardless of wear of clutch facing elements of the clutch disc assembly.

BRIEF DESCRIPTION OF THE DRAWINGS

Various other objects, features and attendant advantages of this invention will be more fully appreciated as the same becomes better understood from the following detailed description when considered in connection with the accompanying drawings, wherein like reference numerals designate like or corresponding parts throughout the several views and in which.

DESCRIPTION OF THE ILLUSTRATED EMBODIMENTS

Figure 1:
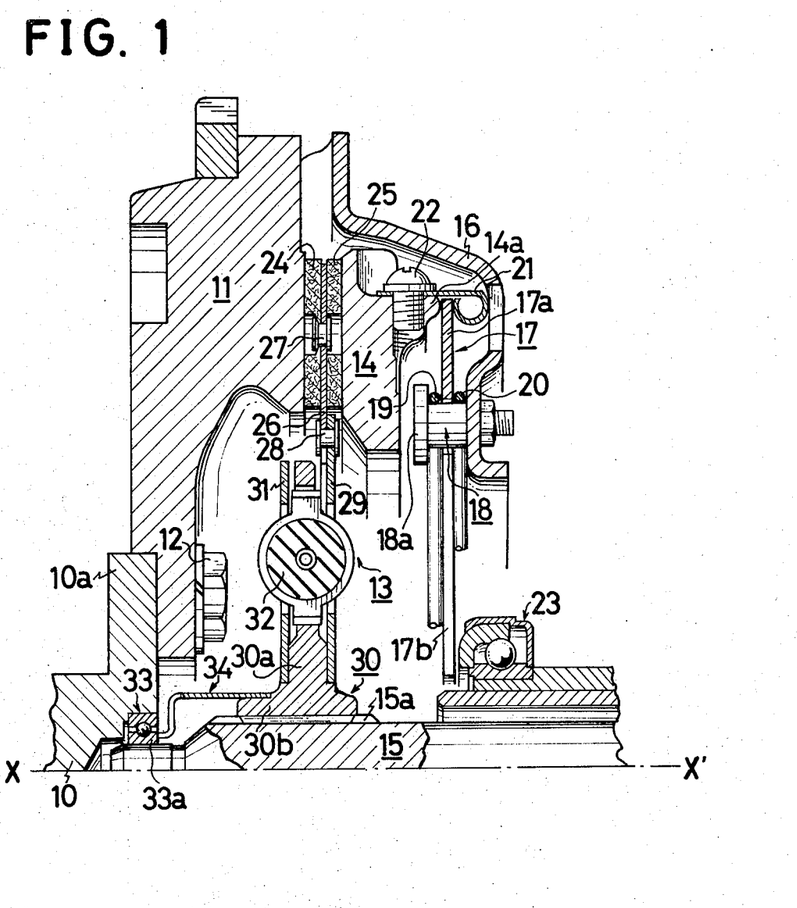
FIG. 1 is substantially a half of an axial section of a first embodiment of the invention wherein the clutch is seen in its engaged position.
Figure 2:
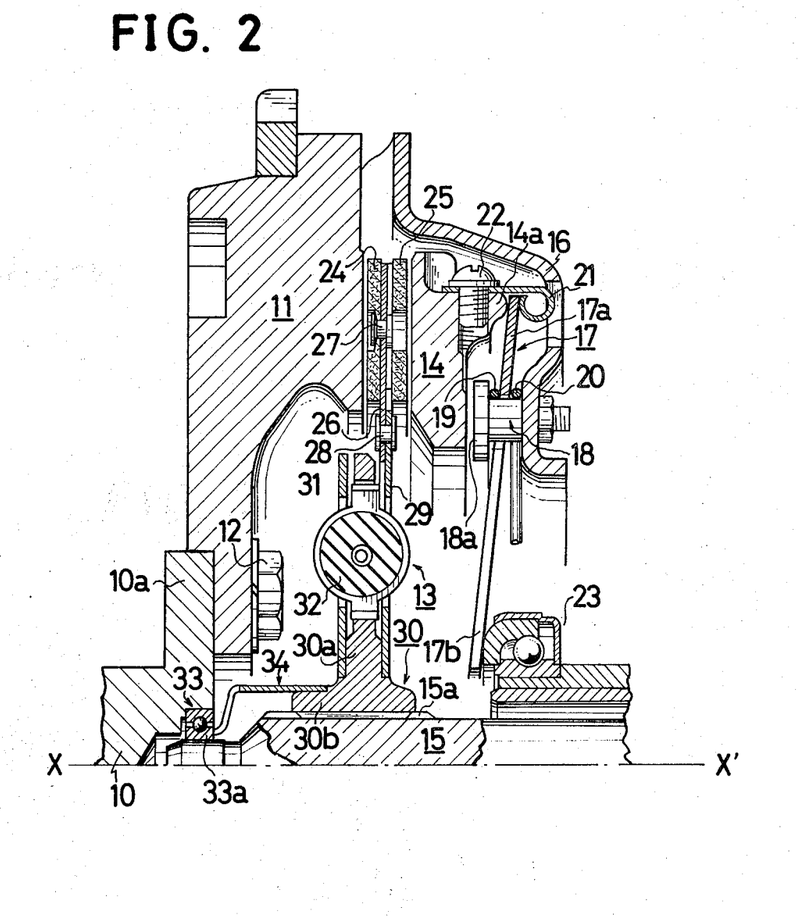
FIG. 2 is a view similar to FIG. 1, wherein, however, the clutch is disengaged and a clutch releasing mechanism according to this invention is brought into actuation.

Referring now to FIGS. 1 and 2 of the accompanying drawings, the first embodiment of the invention will be described hereinbelow in detail.

In these figures, the numberal 10 represents only partially a crankshaft of an internal combustion engine, not shown, fitted on an automotive vehicle, again not shown, an end flange 10a being provided at the illustrated end of the crankshaft and made integral therewith. A flywheel 11, only partially shown, is concentrically and fixedly attached to the shaft flange 10a by means of a plurality of fixing bolts of which only one is shown representatively at 12.

Numeral 13 generally represents schematically and only partially a commonly known clutch disc assembly which is normally squeezed between the flywheel 11 and a pressure plate 14, concentrically arranged and only partially shown, for transmitting drive torque transmitted from the engine crankshaft 10 to a conventional transmission gearing or other means, not shown, through an output shaft 15, which also is only partially shown.

A conventional cover plate 16, only partially shown, is attached concentrically and fixedly to the flywheel 11 by means of a plurality of fixing bolts, not shown. Numeral 17 generally represents a diaphragm spring, only partially shown, being mounted on the cover plate 16 by means of a plurality of rivet members of which only one is shown representatively at 18. The diaphragm spring 17 exerts an axial pressure upon the pressure plate 14 in its actuating direction.

A first pivot ring 19 formed into a large wire ring is inserted, as shown, between an enlarged head at 18a of the rivet member 18 and the diaphragm spring 17, and in a similar way, a second pivot ring 20 of similar configuration is kept in position between diaphragm spring 17 and cover plate 16, so as to maintain the aforementioned relative position of the members 16, 17 and 18. These parts are so designed and arranged that the peripheral ring part 17a of the diaphragm spring 17 urges the pressure plate 14 by pressure contact with a ring-shaped projection 14a of the pressure plate 14 in the leftward axial direction, as seen in FIGS. 1 and 2, so as to maintain the clutch disc assembly 13 in its pressurizedly squeezed position between the flywheel 11 and the pressure plate 14.

Numeral 21 represents a retracting spring, the axially inner part of which is fixedly attached to the outer periphery of the pressure plate 14 by means of a set screw 22. The axially outer part of the retracting spring 21 represents a semi-circular curved cross-section, as shown, and is kept in pressure contact with the outermost part of the ring-shaped part 17a of diaphragm spring 17, so as to urge the latter to abut against the pressure plate 14. In practice, however, a plurality of these retracting springs 21 and the respective fixing screws 22 are arranged radially and separately around the axis X–X' of the mechanism.

When radially and centrally extending arms 17b of the diaphragm spring 17, although only one is representatively shown, are subjected to an axial pressure by a release bearing 23 in clutch release operation, as will be more fully described hereinafter, the aforementioned pressure contact between 17a and 14 is overcome and the retracting spring 21 through the diaphragm spring part 17a is withdrawn, which will serve for forcibly drawing the pressure plate 14 back towards the cover plate 16.

Numeral 24 represents a conventional disc facing member provided at the flywheel side, and numeral 25 represents a similar member provided at the pressure plate side. These disc facing members 24 and 25 are substantially fixedly attached to the respective sides of a disc spring 26 by means of a plurality of fixing rivets of which only one is shown representatively at 27. The inner periphery of the disc spring 26 is fixedly attached as at 28 to a main disc plate 29. The rivets 27 are so designed and dimensioned that the members 24 and 25 can move axially and relative to disc spring 26.

Numeral 30 represents only partially, yet generally, a clutch hub which is formed radially and integrally with a flange 30a mounting on its both sides the main disc plate 29 and an auxiliary disc plate 31. These plates 29 and 31 are somewhat loosely attached to each other by means of rivet or other similar means, not shown, and through an intermediary of a conventional damper unit 32, so as to allow a certain relative rotation therebetween. This damper unit 32 will serve for transmitting torque from the plates 29 and 31 to the clutch hub flange 30a. In practice, however, it should be noted that a plurality of these damper units 32, preferably four in number, are arranged radially with mutually equal peripheral distance, about the axis X–X'. The clutch hub 30 is axially slidably mounted on output shaft 15 through a spline coupling shown at 15a formed thereon. The left-hand end of the output shaft 15 is concentrically and rotatably mounted in the right-hand end of the crankshaft 10 through a pilot bearing 33. A releasing member 34 made of ductile material is elastically disposed within a boss 30b of clutch hub 30 and an inner race 33a of bearing 33. It is desired to construct the setting load of the releasing member 34 at a maximum limiting point of elastic deformation or a range of plastic deformation.

Figure 3:
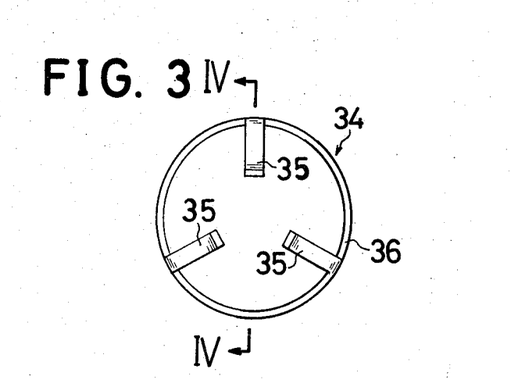
FIG. 3 is an enlarged front view of the releasing member of the invention being used in FIG. 1.
Figure 4:
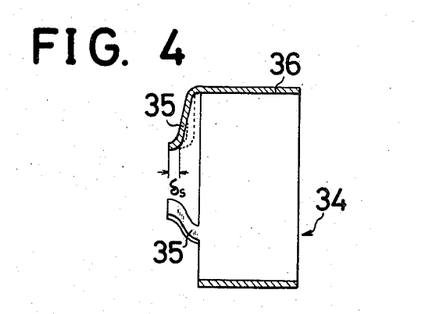
FIG. 4 is an enlarged sectional view taken along the line IV—IV of FIG. 3.
Figure 5:
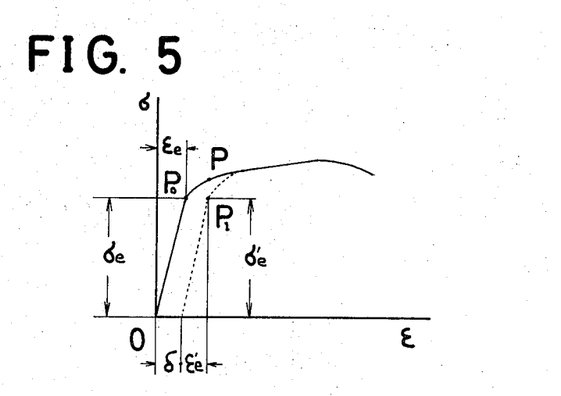
FIG. 5 is a graph diagrammatically representing the characteristics of the releasing member.

Next, referring to FIGS. 3 and 4, the releasing member 34 is shown being provided with three tongue portions 35 symmetrically disposed on the projecting radially inward from an annular tubular portion 36. A free end of each tongue portion 35 contacts the inner race 33a of the pivot bearing 33 and the annular portion 36 is fixedly engaged about the peripheral surface of the boss 30b. Each tongue portion 35 has at least outstanding characteristics of elastic deformation, as shown by the $OP_0$ straight line, and of plastic deformation, as shown by the curved line following the $P_0$ point, as shown in FIG. 5.

In the clutch engaging state as viewed in FIG. 1, the disc 13 is squeezed between the flywheel 11 and the pressure plate 14 as aforementioned. The tongue portions 35 of the releasing member 24 are compressed about 0.5mm at the maximum elastic limit $P_0$ of the tongue portions 35, or against the resilient thrust energy thereof after this limit $P_0$, namely, at a range of plastic deformation, so the hub 30 in FIG. 1 is moved about 0.5mm to the leftward direction from that in FIG. 2, and the tongue portions 35 receive the acting force of the diaphragm spring 17 being operated through the hub 30 and are compressed until the facings 24 and 25 are squeezed between the flywheel 11 and the pressure plate 14. This compressing force of the tongue portions 35 will in turn act as an operating force for forcibly moving the disc 13 to the rightward direction upon the clutch releasing operation.

The operation of the releasing mechanism so far shown and described is as follows:

When the driver of the vehicle depresses the conventional clutch pedal, not shown, the release bearing 23 is shifted axially leftward from its position shown in FIG. 1 to that shown in FIG. 2, as may be easily understood by any person skilled in the art. For this purpose, the clutch pedal is operatively connected with the release bearing 23, although the necessary motion transmitting means have not been shown on account of its very popularity. By this leftward sliding movement of the bearing 23, the extending arms 17$b$ are caused to shift equally leftward by contact thereof with the moving or moved bearing 23. Therefore, the diaphragm spring 17 will perform a corresponding swivelling movement about the pivot rings 19 and 20 as its center, as may be well understood by comparison of FIG. 2 with FIG. 1. Thus, the ring part 17$a$ of the diaphragm spring 17 so far as it is shown on the drawing will shift rightward from the position shown in FIG. 1 to that shown in FIG. 2.

In this way, the clutch disc 13 is released from pressure contact by the pressure plate 14. Thus, the clutch disc is freed. With the rightward displacement of the ring part 17$a$ of the diaphragm spring 17, the pressure plate 14 is forcibly moved rightwards by the catching action of the retracting springs 21.

Although there is a certain amount of sliding resistance at the spline coupling 15$a$ between the clutch hub 30 and the output shaft 15, the clutch disc 13 is forcibly moved 0.5mm in the rightward direction by virtue of the resilient axial pressure of the three tongue portions 35 against this sliding resistance. It will be seen that upon the execution of the clutch release in the aforementioned way, the clutch disc 13 can not be entrained by the rotating flywheel 11 with the engine and its crankshaft 10 kept in rotation. Under these conditions, therefore, a gear shift operation in the transmission gearing can be performed in a smooth manner.

With clutch facings 24 and 25 being subjected to substantial wear after a substantial service period of the clutch, the clutch disc 13 may be gradually moved to the side of flywheel 11. Therefore, when the stress acting on the tongue portions 35 exceeds a certain value, plastic deformation of the tongue portions 35 is caused in accordance with the exceeding amount of said stress by advancement of the disc 13 towards the flywheel 11, namely, the tongue portions 35 in which a plastic deformation has once occurred will offer their returning force to the clutch disc assembly 13 from a further certain value nearly equal to that certain value so that the tongue portions 35 keep the returning amount of the clutch hub 30 constant. FIG. 5 shows a stress-distortion line of the material being used for the releasing member 34 of the invention. It is clear that when the releasing member is made of ductile material as aforementioned and the ductile material in brief is the same within its elastic limit as that of general spring material, the amount of displacement of the beam (tongue portion 35) is as follows:

$$\delta_s = K\,(2L^2\,\sigma_e/E\,h)$$

$\delta_s$: returning amount of spring
K : spring constant
E : modulus of elasticity of Young's modulus
L : length of beam
h : thickness of beam
$\sigma_e$ : stress within elastic limit
$\epsilon_e$ : distortion within elastic limit The broken line shows the relation between $\sigma$ and $\epsilon$ after the deformation of the beam reaches a point P, namely, after the beam is deformed by $\delta$.

$\sigma_e'$ : stress within elastic limit after plastic deformation $\delta$ $\epsilon_e'$ : distortion within leastic limit after plastic deformation $\delta$ Thereby, if $b$ is the width of beam when the beam is deflected by $\delta_s$, a returning force of spring $P_x$ acting on the beam is as follows:

$$P_x = (1/K)\,(Eh^3/12)\,(b\,\delta_e/L^3)$$

Accordingly, if the sliding resistance R at the spline coupling 15$a$ between the clutch hub 30 and the output shaft 15 is smaller than $P_x$, the clutch releasing operation can be certainly performed. In addition, with wearing of the facings 24 and 25, the clutch hub 30 becomes nearer to the side of the flywheel 11 so that the stress of the tongue portion 35 becomes geater and the tongue portion 35 is subject to plastic deformation when the stress of the tongue portion 35 exceeds the stress of elastic limit $\delta_e$. In this state $\sigma_e$ is nearly equal to $\sigma_e'$, and $\epsilon_e$ is nearly equal to $\epsilon_e'$. $P_0$ point is shifted to $P_1$ in this time.

The returning amount of the spring $\delta_s'$ after elastic deformation is as follows:

$$\delta_s' = K\,(2\,L^2\,\sigma_e'/E\,h)$$

Consequently the returning amount of the spring $\delta_s'$ is held to be nearly equal to $\delta_s$ even after plastic deformation.

This is to say, the clutch disc 13 is moved toward the flywheel 11 in accordance with the amount of wearing of the facings 24 and 25, and in that time, the amount of movement of the clutch disc 13 and the force of the spring are kept constant, respectively, at any wearing stage of the facings so that there is no accidental chance for the facing 25 adhering to the pressure plate 14 and the disc 13 making retrained rotation with the flywheel 11. Therefore, the clutch release operation can be performed in a smooth way.

Figure 6:
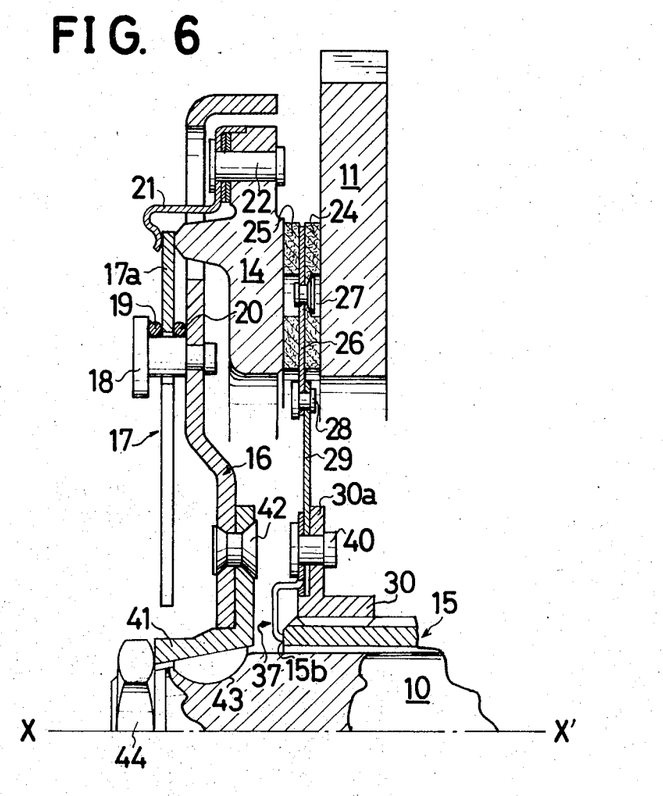
FIG. 6 is a view similar to FIG. 1, illustrating however, a second embodiment of the invention.
Figure 7:
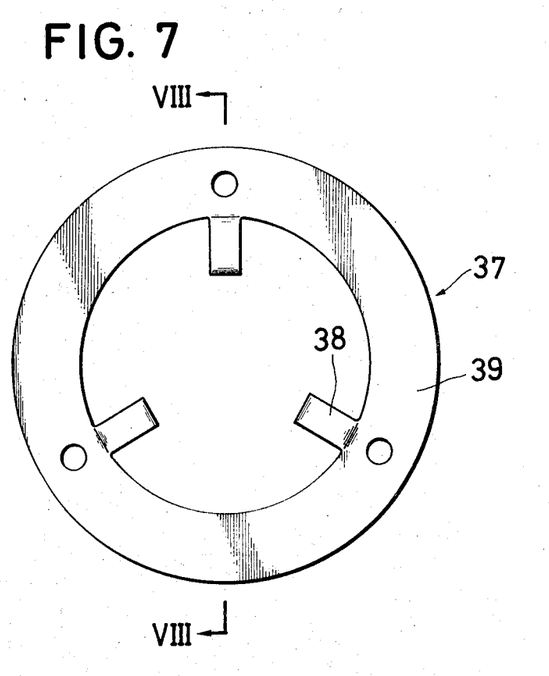
FIG. 7 is a front view of a releasing member of the invention being used in FIG. 6.
Figure 8:
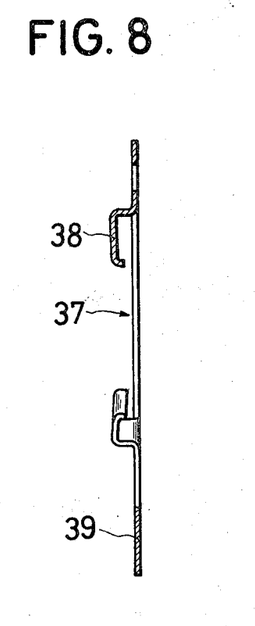
FIG. 8 is a sectional view taken along the line VIII—VIII of FIG. 7.

Next, referring to FIGS. 6, 7 and 8, the second embodiment of the invention will now be described hereinbelow in detail.

This embodiment however, shows a releasing member 37 being equipped with the clutch of a front engine and a front driving type. The output shaft 15 and the crankshaft 10 are concentrically arranged in this clutch type, and the crankshaft 10 has no pilot bearing 33 for supporting the output shaft 15 as in the foregoing embodiment of FIG. 1. The releasing member 37 is provided with three tongue portions 38 and a circular disc portion 39 and the free end of each tongue portion 38 is engaged by an end portion 15$b$ of the output shaft 15. The circular disc portion 39 is fixed to the flange 30$a$ of the clutch hub 30 by rivets 40. The cover 16 is fixedly connected by rivets 42 to a cover sleeve 41 which is drivingly connected to the left end of the crankshaft 10 by a woodruff key 43. Numeral 44 is a screw member for preventing axial withdrawal of the sleeve 41 from the crankshaft 10.

In this embodiment, the construction of the releasing member 37 and the operation thereof are substantially the same as in FIG. 1 so that the description thereabout will be omitted.

Figures 9, 10, 11:
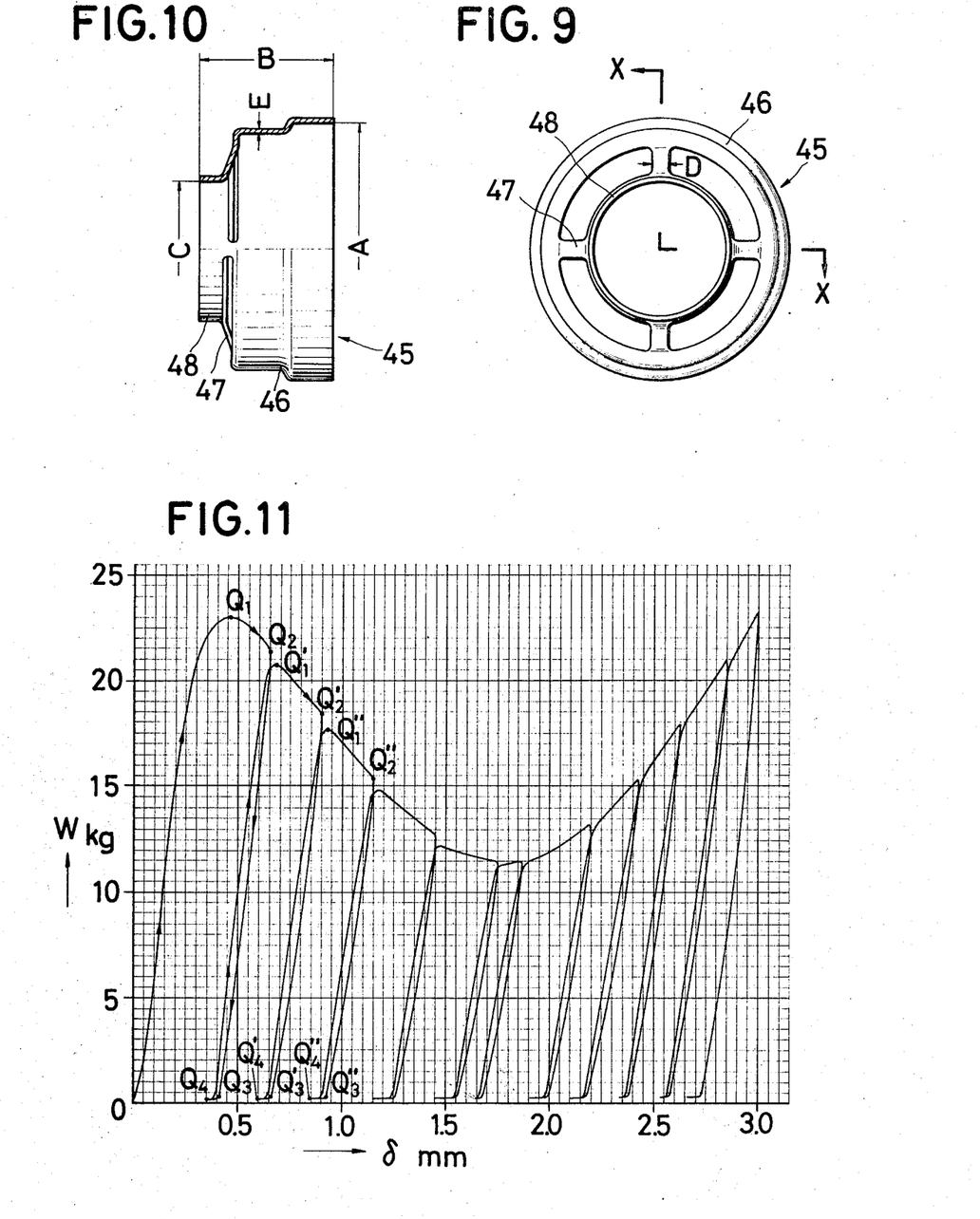
FIG. 9 is an enlarged front view of a modification of the releasing member according to this invention.
FIG. 10 is an enlarged sectional view taken along the line X—X of FIG. 9.
FIG. 11 is a graph diagrammatically representing the experimental results of the releasing member in FIGS. 9 and 10.

Referring now to FIGS. 9 and 10, a releasing member 45 is a third modification, the condition of the attachment and the operation thereof being the same as those of FIG. 1. The releasing member 45 is provided with an outer stepped annular tubular portion 46 and four leg portions 47 inwardly extending from the portion 46 with an inner end of each leg portion 47 being formed integrally with an inner tubular portion 48. The outer stepped annular tubular portion 46 of the releasing member 45 is fixedly connected to the boss 30b of the clutch hub 30 and the inner tubular portion 48 is contacted with the inner race 33a of the pilot bearing 33 the same as in FIG. 1. The construction and the operation of the releasing member 45 are the same as those in FIG. 1 so that further explanation may be omitted.

STill referring to FIGS. 9 and 10, the specification of the releasing member 45 is as follows: A=30mm in diameter, B=16mm, C=16mm., D=2mm., E=0.5mm. and the material thereof is SPCD (Japanese Industrial Standards). Referring to FIG. 11, the experimental results of the releasing member 45 in FIGS. 9 and 10 are shown, and it is seen that according to the increase of the displacement $\delta$ from O to $Q_1$ the load W acting on the inner tubular portion 48 is increased, while however, the load W is decreased to $Q_2$ when the displacement $\delta$ is increased after $Q_1$, and once the lead W is decreased from $Q_2$ to $Q_3$ and $Q_4$, the displacement $\delta$ is decreased from $Q_2$. The load W is increased from $Q_4$ to $Q'_1$ when the displacement $\delta$ is again increased. Then, the load W is decreased when the displacement $\delta$ is increased after $Q'_1$. Accordingly, a line connecting the points O, $Q_1$, $Q_2$, $Q_3$ and $Q_4$ represent one cycle, another cycle is shown by a line connecting the points $Q_4$, $Q'_1$, $Q'_2$, $Q'_3$ and $Q'_4$, and a further cycle is shown by a line connecting the points $Q'_4$, $Q''_1$, $Q''_2$, $Q''_3$ and $Q''_4$, the cycles depicting continuous performaance. A locus of the points $Q_1$, $Q_2$, $Q'_1$, $Q'_2$, $Q''_1$ and $Q''_2$ may be described as an imaginary parabola and each of the points $Q_4$, $Q_3$, $Q'_4$, $Q'_3$, $Q''_4$ and $Q''_3$ is positioned on an imaginary straight line seen as being just a little above the O level.

By these experimental results the following features are proved: first, that it is capable of obtaining a normally certain amount of displacement $\delta$ according to wearing of the clutch facing elements 24 and 25 being caused by repetition from clutch engaging operation to clutch disengaging operation and vice versa, because in the displacement $\delta$, a difference between $Q_2$ and $Q_3$ is nearly equal to a difference between $Q'_2$ and $Q'_3$ which is nearly equal to a difference between $Q''_2$ and $Q''_3$. Also, while the load W is decreased from $Q_2$ to $Q_3$ when the displacement $\delta$ is decreased from $Q_2$, it is still a fact that the load W at this time acts on the releasing member 45. Therefore, if the resisting force at the spline coupling 15a is 5kg, the lead W which is being applied from the point $Q_2$, the load of which is 21.5kg to the resisting force, i.e., 5kg, acts on the releasing member 45 as an operating force for returning the clutch disc assembly 13 from the flywheel 11, and it is surely capable of disengaging the clutch.

Accordingly, by utilizing the aforedescribed releasing members made of at least SPCD having both plastic and elastic deformation, it is possible to provide both functions of positively returning the clutch disc assembly 13 and of compensating for wear on the friction elements 24 and 25 thereof.

Obviously many changes and modifications of the present invention are possible in light of the foregoing teachings. It is to be understood, therefore, that within the scope of the appended claims, the invention may be practiced otherwise than as specifically described herein. accordingly,

What is claimed as new and desired to be secured by letters patent of the united states is:

1. A vehicle clutch releasing mechanism comprising:
    A crankshaft being driven with an engine;
    a flywheel fixedly mounted on said crankshaft;
    a cover plate fixedly attached to said flywheel;
    a pressure plate mounted axially and slidably on said cover plate and rotatable in unison with said cover plate;
    an output shaft mounted on and rotatable relative to said crankshaft;
    a clutch disc assembly provided between said flywheel and said pressure plate and mounted axially slidably on and rotatably in unison with said output shaft, said disc assembly being provided with a pair of facing elements at each side thereof;
    said mechanism being characterized by the provision of a releasing means having tongue portions and an annular portion integral therewith being coaxially disposed about said output shaft between said crankshaft and said clutch disc assembly and being made of a ductile material having both ranges of elastic and plastic deformation and being assembled resiliently and immovably in an axial direction in the clutch engaging slate, and adapted for positively urging said clutch disc assembly to move toward said pressure plate during clutch releasing operation and for compensating for the wearing amount of said clutch facing elements by said plastic deformation in dependence upon the wear of said clutch facing elements.

2. The vehicle clutch releasing mechanism as set forth in claim 1, characterized by an end of each tongue portion being contacted with an inner race of a pilot bearing being provided on said output shaft for supporting an end thereof, while said annular portion is fixedly contacted with a clutch hub comprising in said clutch disc assembly.

3. A vehicle clutch releasing mechanism comprising:
    a crankshaft being driven with an engine;
    a flywheel fixedly mounted on said crankshaft;
    a cover plate fixedly attached to said flywheel;
    a pressure plate mounted axially and slidably on said cover plate and rotatable in unison with said cover plate;
    an output shaft mounted on and rotatable relative to said crankshaft;
    a clutch disc assembly provided between said flywheel and said pressure plate and mounted axially slidably on and rotatably in unison with said output shaft, said disc assembly being provided with a pair of facing elements of each side thereof;
    said mechanism being characterized by the provision of a releasing means having tongue portions and a circular disc portion integral therewith being coaxially disposed about said output shaft between said crankshaft and said clutch disc assembly and being made of a ductile material having both ranges of elastic and plastic deformation and being assembled resiliently and immovably in an axial direction in the clutch engaging state, and adapted for positively urging said clutch disc assembly to move toward said pressure plate during clutch releasing operation and for compensating for the wearing amount of said clutch facing elements by said plastic deformation in dependence upon the wear of said clutch facing elements.

4. The vehicle clutch releasing mechanism as set forth in claim 3, characterized by an end of each tongue portion being contacted with said output shaft, while said circular disc portion is fixedly connected with a clutch hub comprised in said clutch disc assembly.

5. A vehicle clutch releasing mechanism comprising:
a crankshaft being driven with an engine;
a flywheel fixedly mounted on said crankshaft;
a cover plate fixedly attached to said flywheel;
a pressure plate mounted axially and slidably on said cover plate and rotatable in unison with said cover plate;
an output shaft mounted on and rotatable relative to said crankshaft;
a clutch disc assembly provided between said flywheel and said pressure plate and mounted axially slidably on and rotatably in unison with saie output shaft, said disc assembly being provided with a pair of facing elements at each side thereof;
said mechanism being characterized by the provision of a releasing means having an outer stepped annular tubular portion, an inner tubular portion and leg portions being disposed between said outer and inner tubular portions, said outer and inner tubular portions said leg portions being formed integrally with each other, and being coaxially disposed about said output shaft between said crankshaft and said clutch disc assembly and being made of a ductile material having both ranges of elastic and plastic deformation and being assembled resiliently and immovably in an axial direction in the clutch engaging state, and adapted for positively urging said clutch disc assembly to move toward said pressure plate during clutch releasing operation and for compensating for the wearing amount of said clutch facing elements by said plastic deformation in dependence upon the wear of said clutch facing elements.

* * * * *